United States Patent [19]

Shakkottai et al.

[11] Patent Number: 4,896,540

[45] Date of Patent: Jan. 30, 1990

[54] AEROACOUSTIC FLOWMETER

[76] Inventors: Parthasarathy Shakkottai, 2622 Gardi St., Duarte, Calif. 91010; Eug Y. Kwack, 20946 E. Canyon Ridge Rd., Walnut, Calif. 91789

[21] Appl. No.: 179,076

[22] Filed: Apr. 8, 1988

[51] Int. Cl.$^4$ ............................ G01F 1/86; G01F 15/04
[52] U.S. Cl. ...................................... 73/861.02; 73/29; 73/861.18; 73/861.27
[58] Field of Search ................... 73/29, 861.02, 861.04, 73/861.18, 861.27, 861.28

[56] References Cited

U.S. PATENT DOCUMENTS

| | | |
|---|---|---|
| 2,492,371 | 12/1949 | Sivian . |
| 3,218,852 | 11/1965 | Scarpa et al. . |
| 3,349,614 | 10/1967 | Parker . |
| 3,427,881 | 2/1969 | Steinberg . |
| 3,451,269 | 6/1969 | Johnson . |
| 3,470,743 | 10/1969 | Steinberg . |
| 3,885,436 | 5/1975 | Meyer . |
| 4,337,667 | 2/1982 | Takada . |
| 4,372,166 | 2/1983 | Loveland . |
| 4,372,167 | 2/1983 | Loveland . |
| 4,445,389 | 5/1984 | Potzick . |
| 4,478,088 | 10/1984 | Loveland . |
| 4,572,003 | 2/1986 | Fritz . |

OTHER PUBLICATIONS

Parthasarathy et al., Sound Generation by Flow Over Relatively Deep Cylindrical Cavities, J. Aco. Soc. An 78(5), Nov. 85, 1785–1795.
Shakkottai et al.; High Intensity Tone Generation by Aeroacoustic Sources, J. Acos. Soc. An. 82(6), Dec. 87, 2075–2085.
Migliorini et al., Linear Differential Pressure Flow Metering with Genuine 100:1 Turndown Capability, ISA 1987, 87-1266.

Primary Examiner—Charles A. Ruehl

[57] ABSTRACT

The flowmeter is based on a measurement of phase difference between two points on the circumference of a pipe separated axially by an integral multiple of sound wavelength. Plane sound waves are generated aeroacoustically by a non-protruding ring cavity energized either directly by the flow or by a subsidiary flow of the same medium. The frequency of the aeroacoustic source varies with temperature and therefore the temperature can be obtained. In the case of steam flow, temperature can be measured independently and therefore from the measured frequency (or speed of sound), the quality of wet steam can be measured. The flowmeter is linear in velocity and no calibrations are required.

11 Claims, 24 Drawing Sheets

Unidirectional Waves

STANDING WAVES IN PIPE

Bidirectional Propagation

EXPERIMENTAL APPARATUS

AEROACOUSTIC FLOWMETER

This invention was made with Government support under Contract No. DE-AI05-84CE40684 awarded by NASA. The Government has certain rights in this invention.

BACKGROUND OF THE INVENTION

1. Field of the Invention

The present invention is directed to a device and method of deriving average flow velocity in a pipe carrying flow by using flow generated sound waves moving along and opposite to the flow. Flow information is obtained from the phase difference of sound signals sensed on the walls of the pipe.

2. Description of the Prior Art

Flow of gases and liquids are commonly measured by orifice flowmeters which produce a pressure difference varying as the square of the flow velocity. As the orifice wears out, the flow coefficient changes which requires either a replacement or recalibration. Flowmeters based on orifice plates require large upstream and downstream segments of straight pipe for proper operation. Accuracy suffers at low flow rates because the pressure difference decreases rapidly as the square of flow velocity. The minimum flow velocity is at best only on a quarter of the maximum flow velocity.

Vortex shedding flowmeters use the measurement of frequency of vortices shed periodically by a body projecting into the flow. In this case, the frequency varies linearly with flow over the range when eddy shedding occurs. Near zero flow, this flow meter will not work.

Acoustic flowmeters of the type suitable for flows in large pipes have been described. For example, the long wavelength acoustic flowmeter by James E. Potzick[1] and Baldwin Robertson (U.S. Pat. No. 4,445,389; May 1, 1984) makes use of acoustic waves generated by loud speakers mounted on the side of a pipe. The waves are detected by two flush mounted microphones. Frequencies of operation of the source are adjusted such that maxima of sound pressure occur at the higher frequency which is exactly twice the lower frequency. At this frequency, phases are measured and interpreted. However, this type of acoustic long wave flowmeter can not be used for hot steam flows because a loud speaker can not be designed to operate in such hot flows. Heat and flow surges will destroy the loud speaker in a short time.

A flowmeter using the frequency of oscillations generated by a flow past a cavity are chosen such as to provide a dominant frequency, pressure fluctuations sensed in the cavity are directly related to the flow past the cavity. However, extensive tests by us on resonant cavity oscillations have shown that when acoustic resonance occurs, the frequency becomes independent of flow[3,4]. When the cavity is not resonant, frequencies are proportional to flow but the constant of proportionality is not very constant. It is doubtful that an accurate flowmeter could be made using Fritz's concept.

Migliorini[5] describes linear differential pressure flow metering with genuine 100:1 turndown capability which involves flow through an annular area which varies with flow. This uses spring loaded center bodies which move as flow increases thereby reducing the pressure difference.

Acoustic flowmeters using ultrasonic waves are used for liquid flows, mostly in biomedical applications. These generally use piezoelectric transducers which do not work at high temperatures. Also, ultrasonic waves cannot be generated efficiently in gaseous media by such transducers.

OBJECTS AND SUMMARY OF THE INVENTION

It is a primary object of the present invention to provide a system for measuring the flow velocity in pipes carrying gas flow at arbitrary pressures and temperatures by a non-obstructing, rugged device.

The present invention is named the aero-acoustic flow and temperature sensor because the device can measure both flow velocity and temperature of a single phase flow from measurements of a phase difference and frequency.

For the case of steam flow, additional information can be obtained. From the measured mean pressure p and sound speed c (which depends on frequency) and the temperature T, specific volume V, ratio of specific heats $\gamma$, enthalpy h, entropy S and steam quality x may be obtained by using the steam charts.

BRIEF DESCRIPTIONS OF THE DRAWINGS

A more complete appreciation of the invention and the attendant advantages thereof will be more clearly understood by reference to the following drawings herein:

Figure 12:
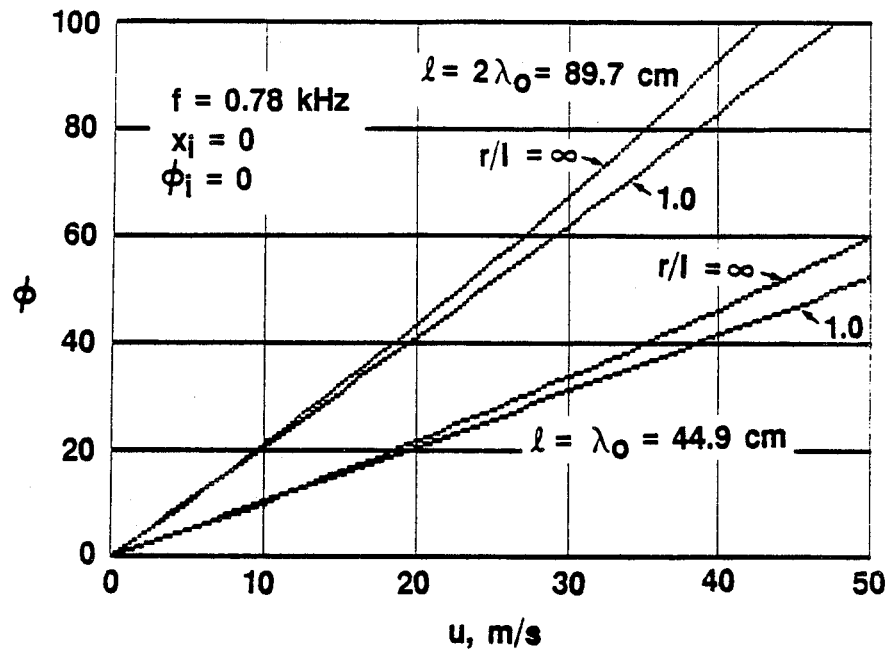
Figure 13:
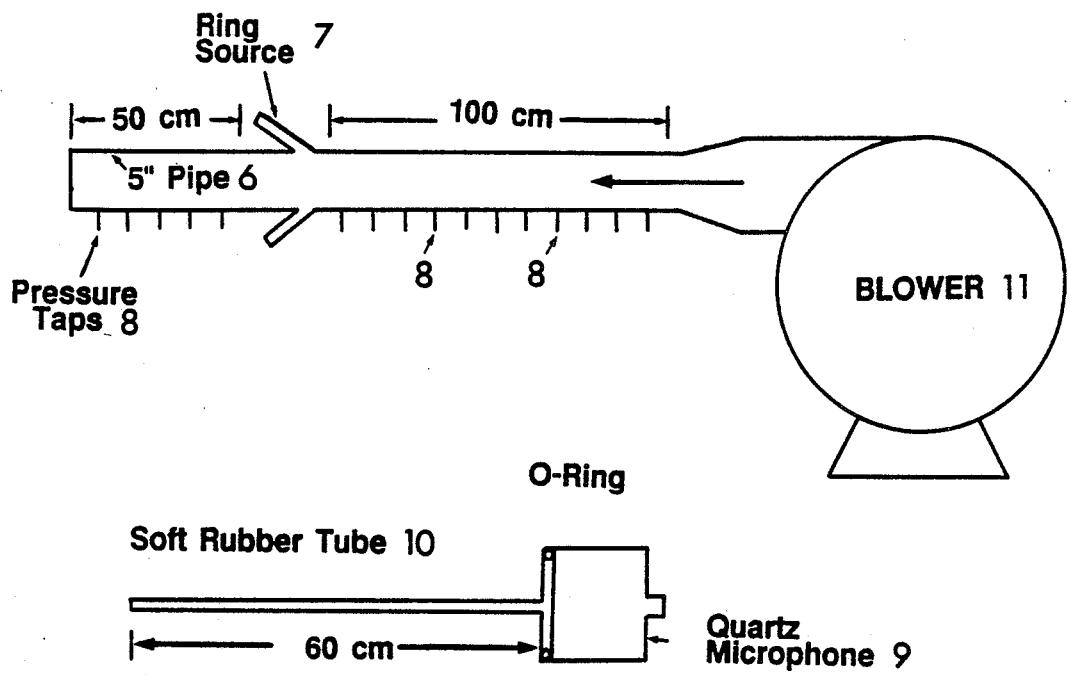
Figure 14:
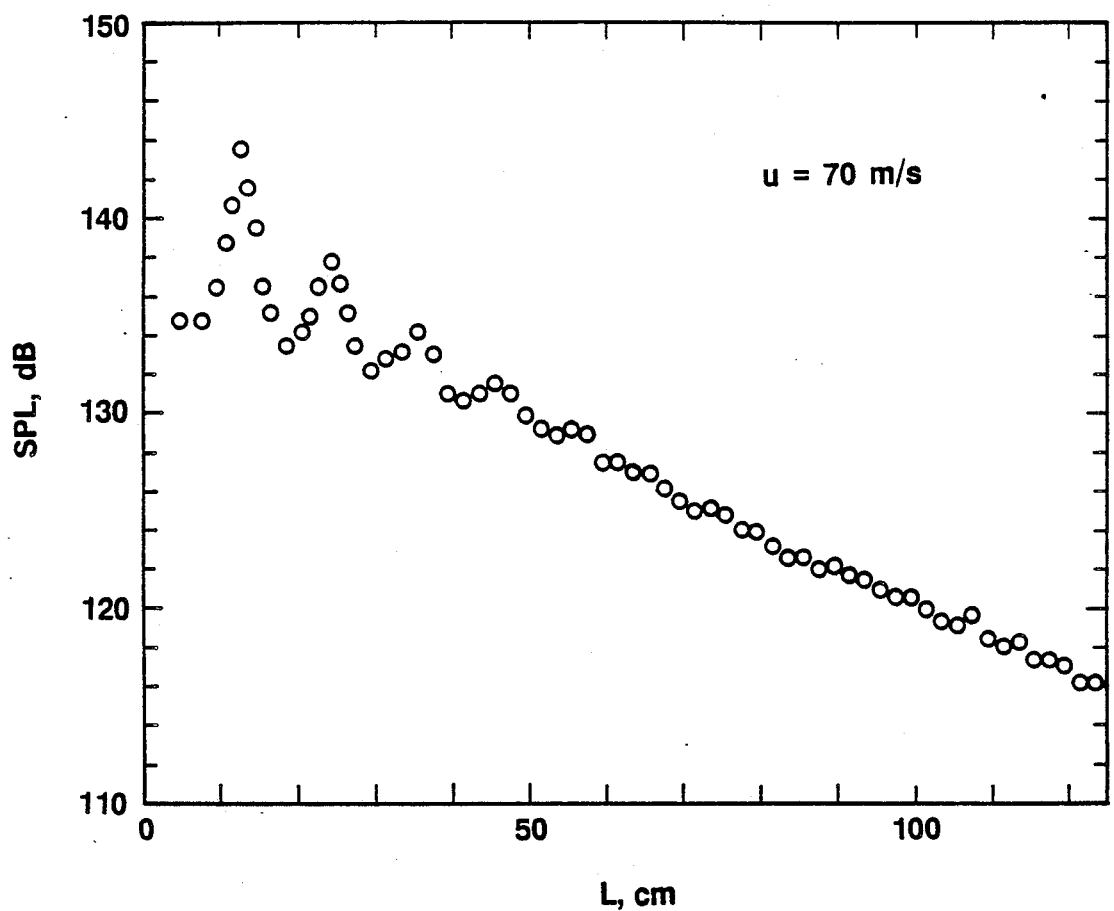
Figure 15:
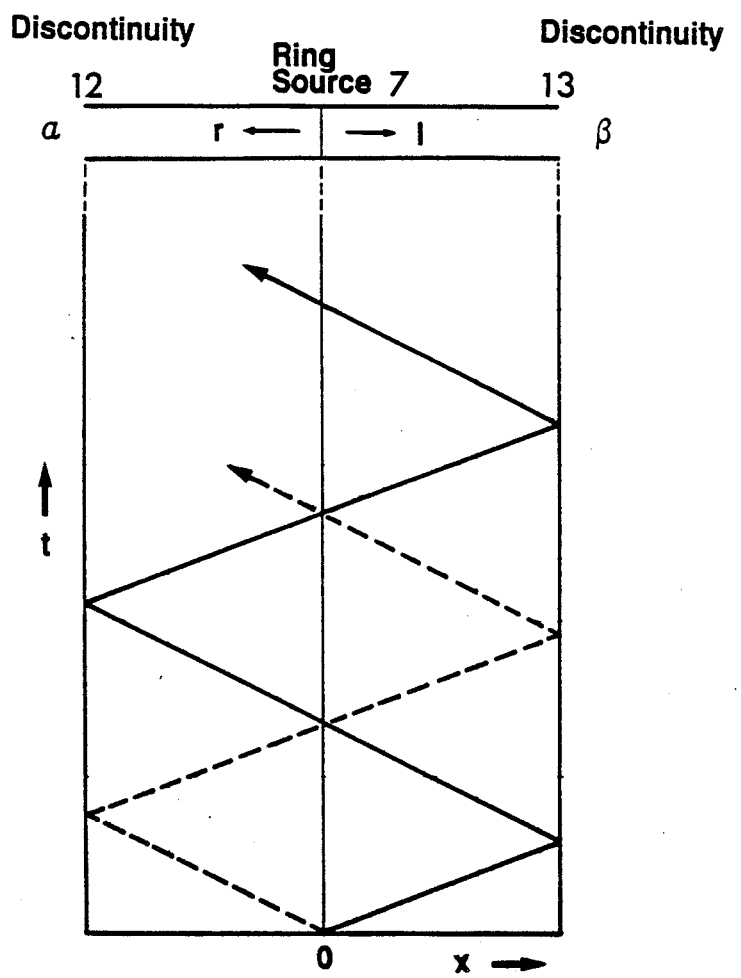
Figure 16:
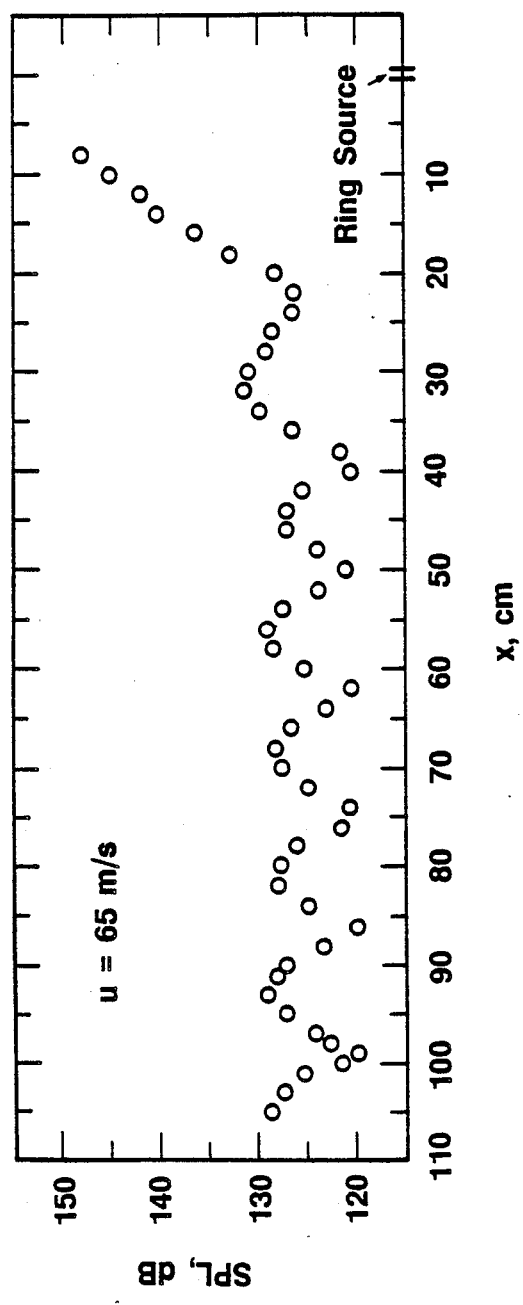
Figure 17:
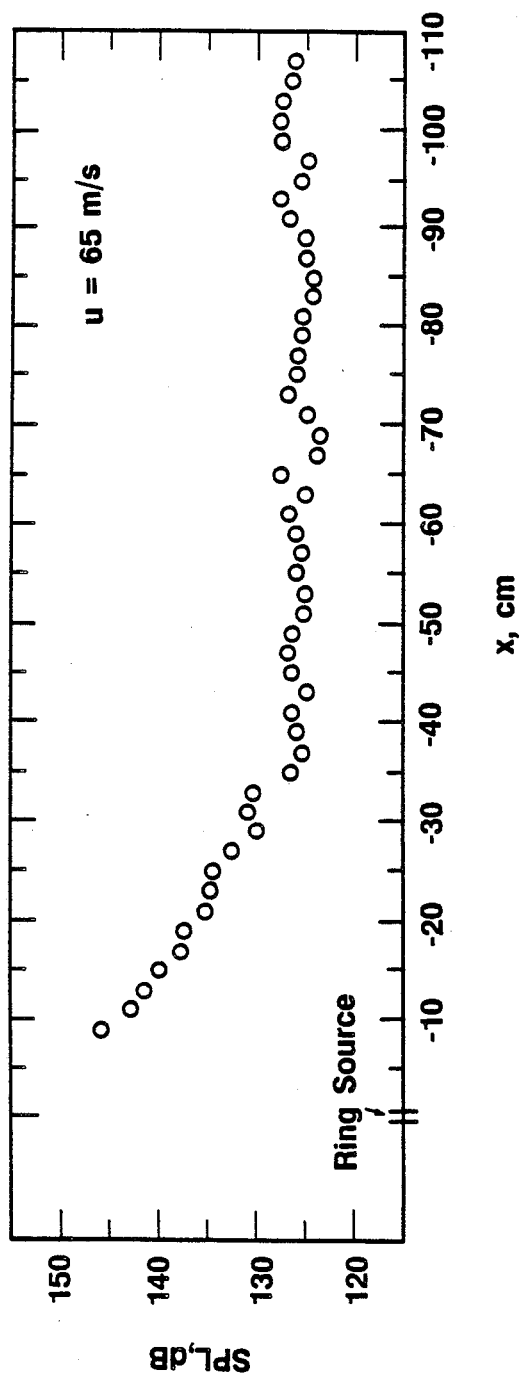
Figure 18:
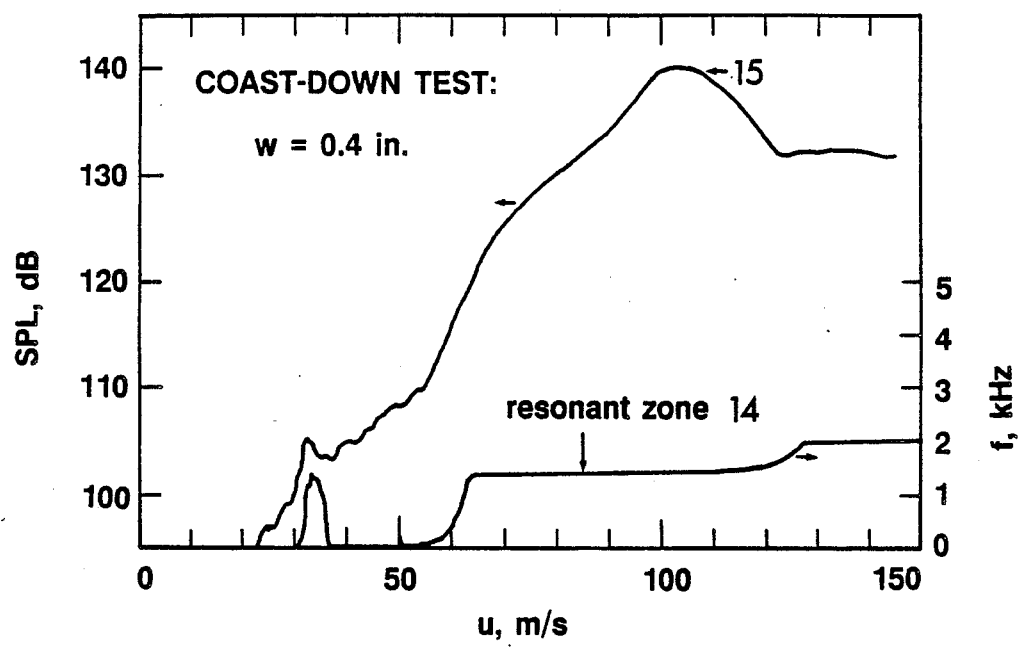
Figure 19:
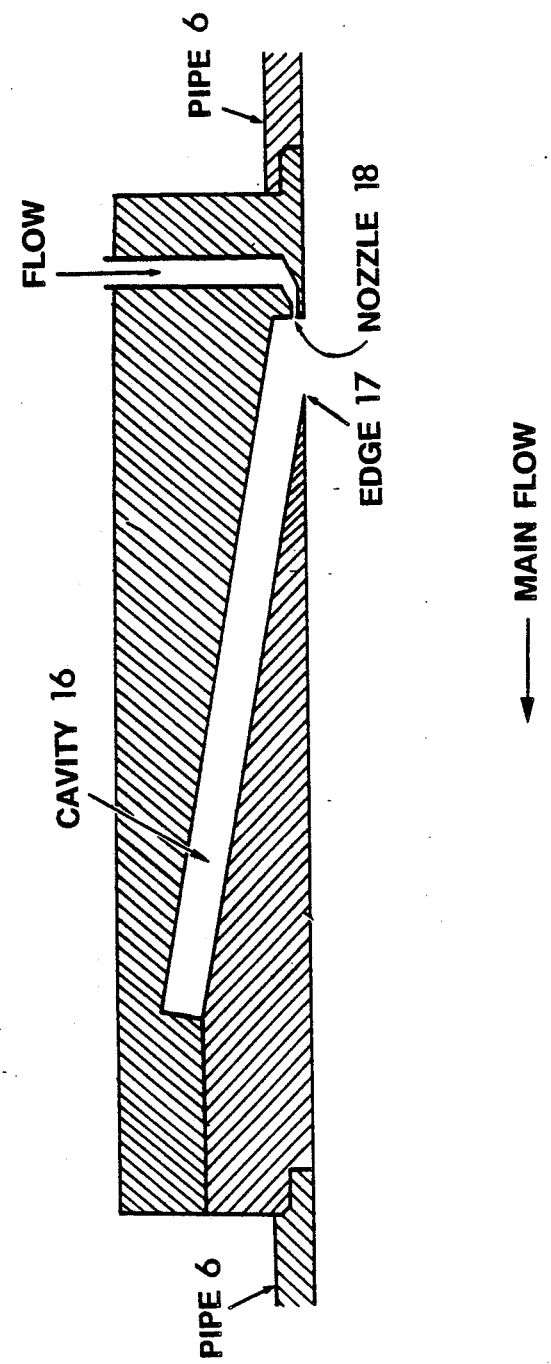
Figure 20:
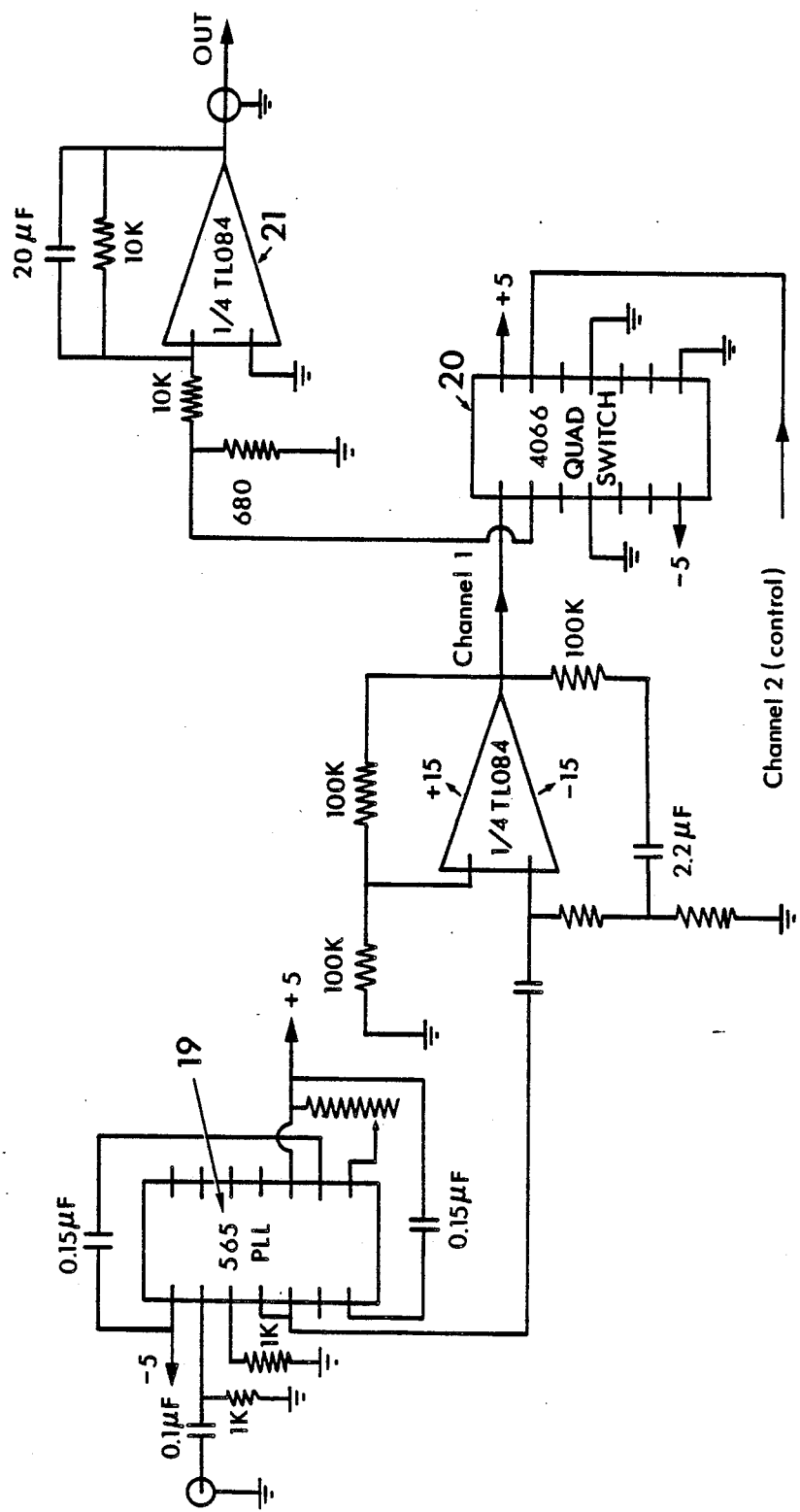
Figure 21:
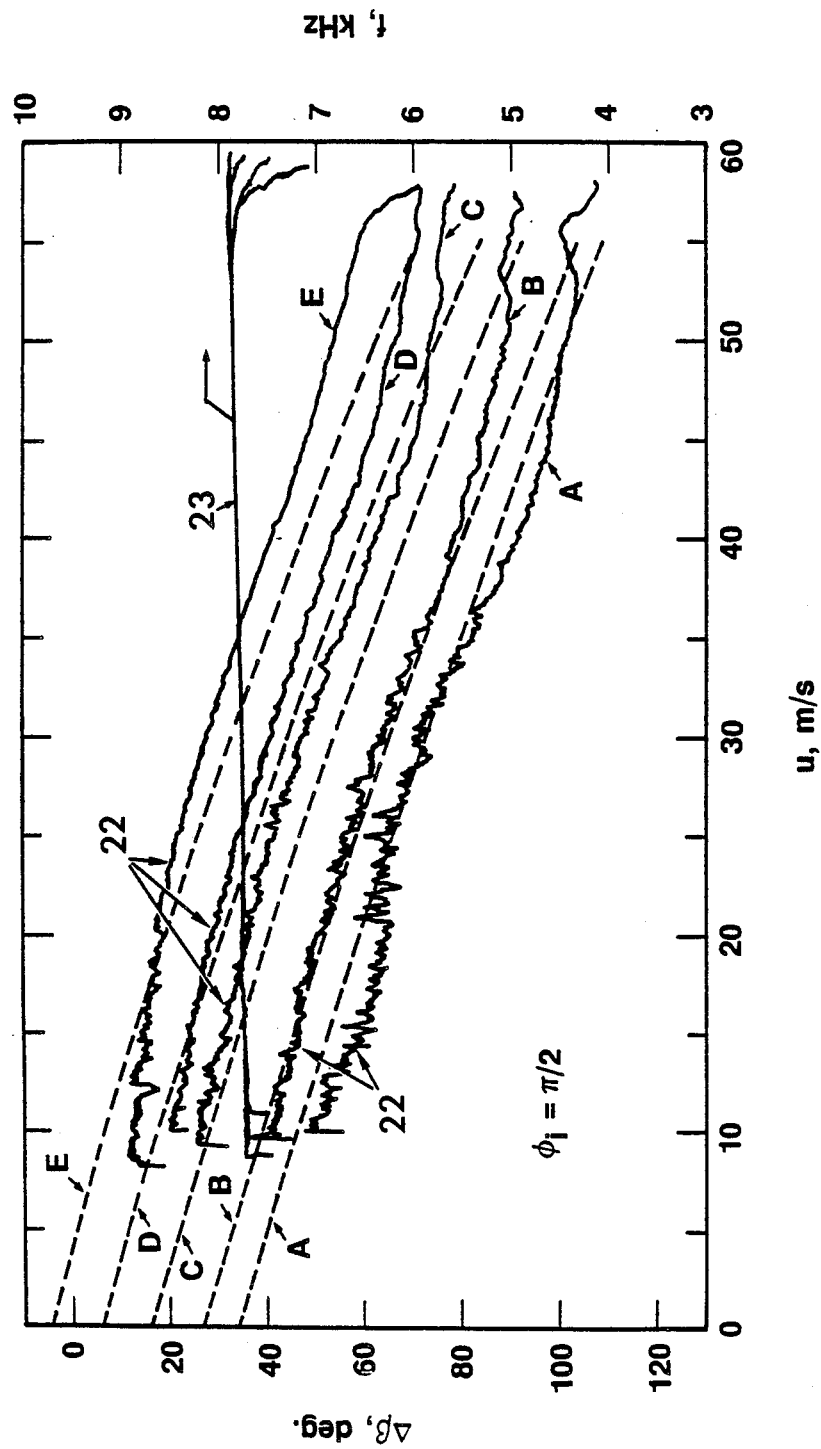
Figure 22:
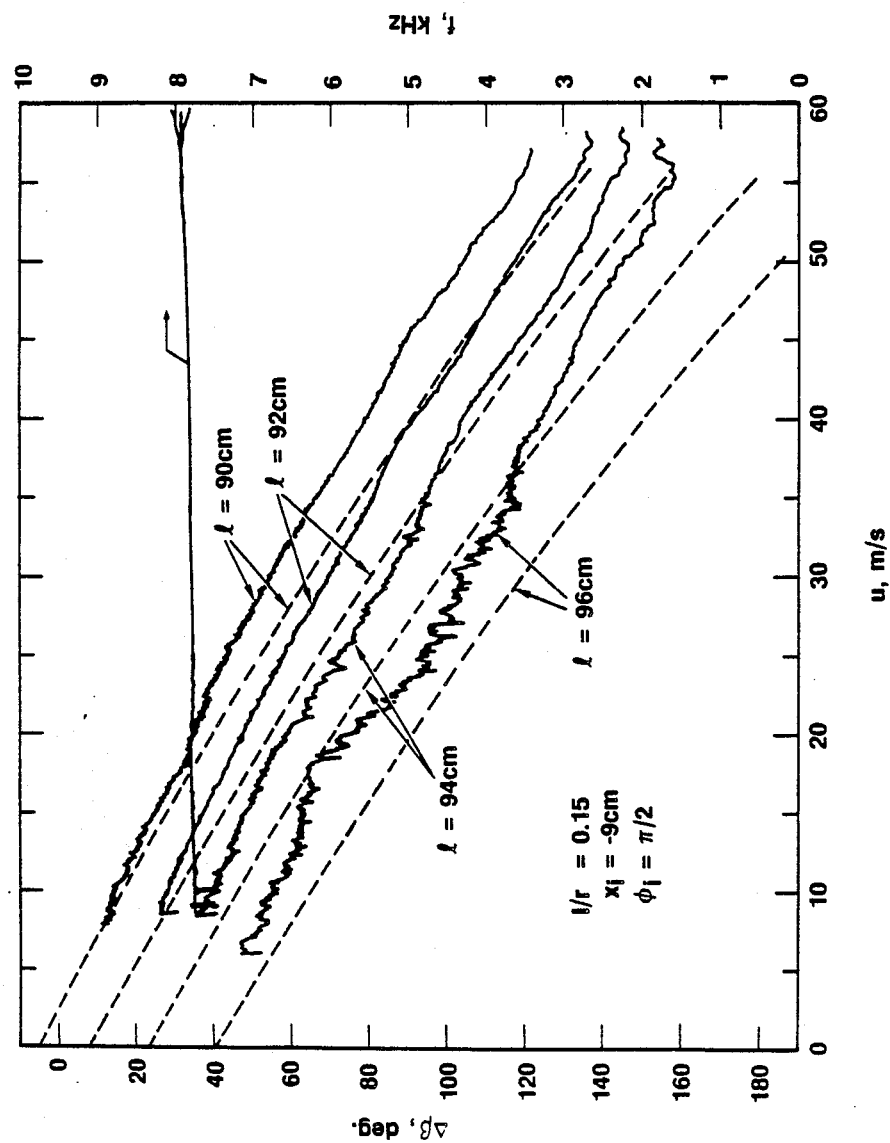
Figure 23:
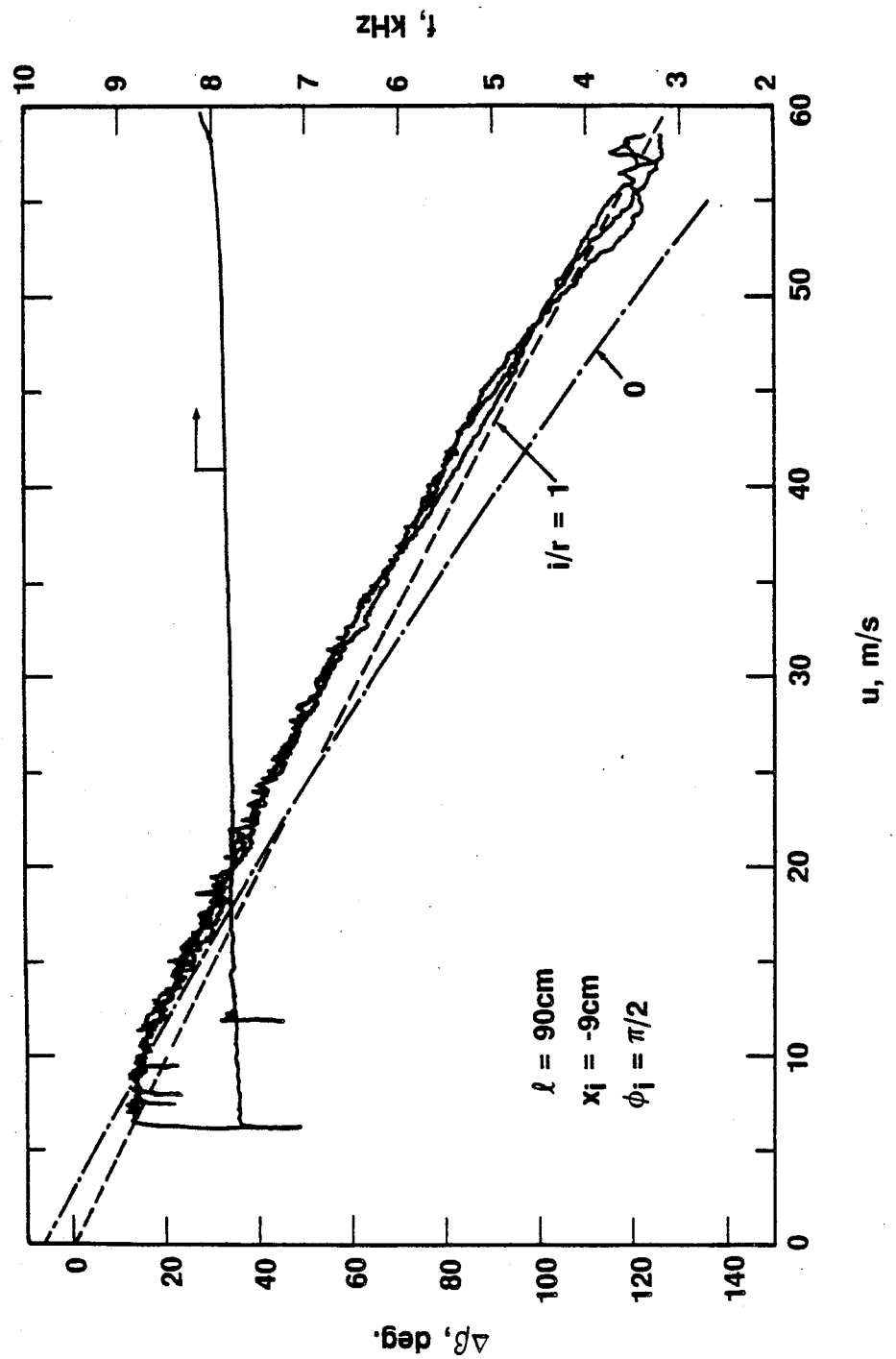
Figure 24:
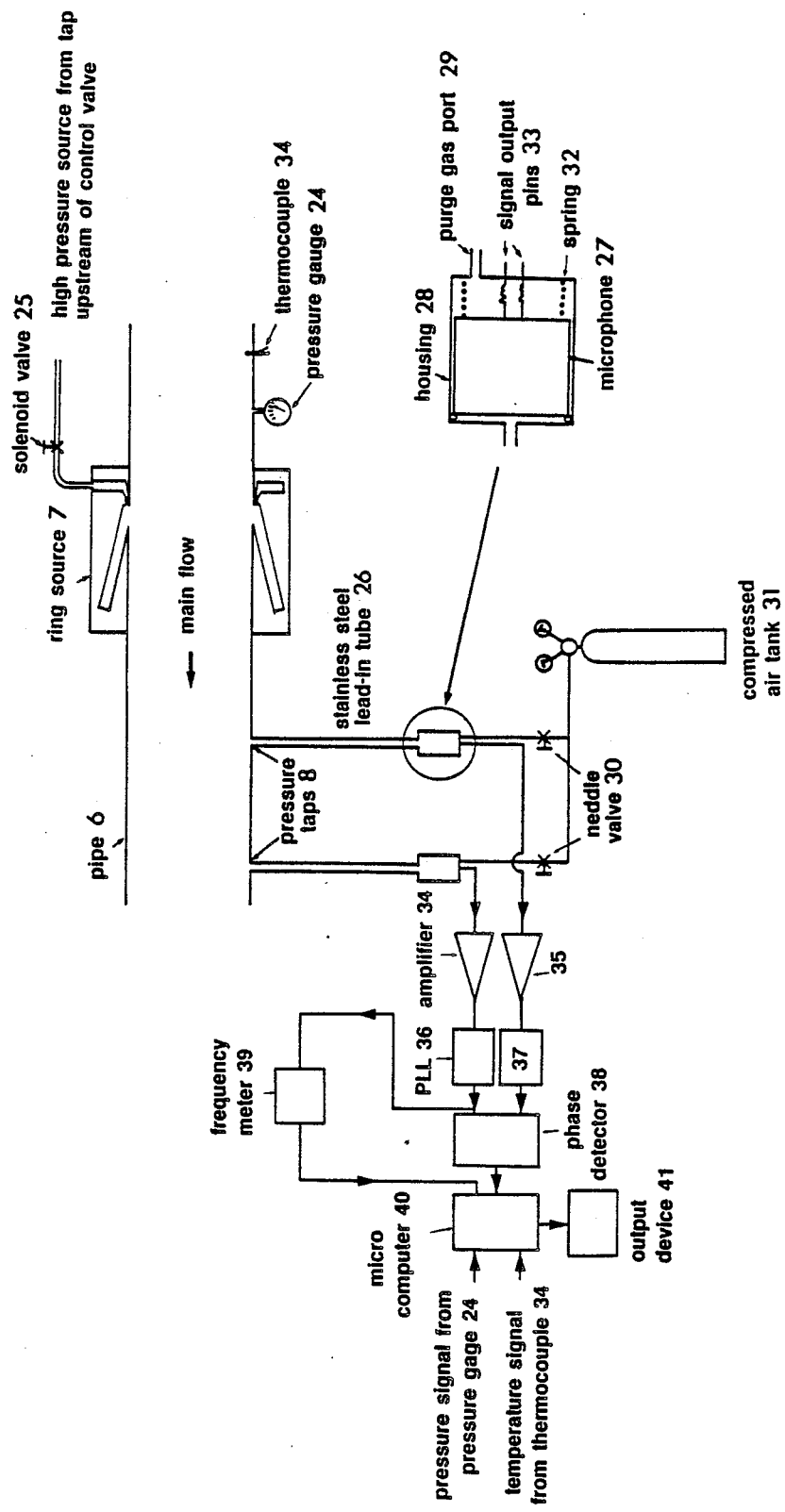

FIG. 12 compares the phase plots in air flow of r/I=1 with those with r/I=∞ for upstream-going waves;

FIG. 13 is a sketch of an apparatus used to examine experimentally the behavior of an acoustic flowmeter where the ring source, pressure taps at which sound waves can be sensed, the detector containing a quartz microphone connected through a narrow bore tubing to a sensing port and a blower able to generate the air flow in the range 0 to 150 m/s are shown;

FIG. 14 exhibits the transducer characteristics in the form of sound pressure level vs. distance showing the occurrence of standing waves in the lead-in tubes which exist at short lengths; in this case the damping is large enough to remove resonances for tubing lengths exceeding 60 cm;

FIG. 15 shows a sketch of the wave diagram of the r and I waves generated by the ring source undergoing reflections at discontinuities upstream and downstream; the wave system combines to form different standing waves upstream and downstream of the ring source at the origin;

FIG. 16 shows distributions of sound pressure levels in decibels measured downstream of the ring source operating at 1380 Hz in air flow of speed equal to 65 m/s; data correspond to measurements by a sensor with lead-in length equal to 7.2 cm; standing waves cause sound pressures to vary periodically with distance;

FIG. 17 shows how the sound pressure level decays upstream of the ring source to an almost constant level indicating that the waves are almost unidirectional;

FIG. 18 shows a typical resonant zone where frequency is almost constant with flow velocity with the occurrence of correspondingly high sound pressure levels, the data being obtained in a rapid coast-down test;

FIG. 19 shows a sketch of a ring source where the subsidiary flow over the sharp edge drives the acoustic resonance in the ring cavity over a wide range of main flow velocities in the pipe;

FIG. 20 shows a sketch of a phase measurement circuit where the two signals are similarly processed; first the signal is applied to a phase locked loop which produces a square wave output locked in frequency and phase to the input signal; the square wave is amplified and made symmetric by an operational amplifier and applied to one terminal of an analogue switch; channel 2 is processed similarly but its output acts as the control input to the switch; the output of the switch is smoothed by the operational amplifier whose output measures accurately the phase difference between the signals of channels 1 and 2;

FIG. 21 shows five phase vs. velocity plots for spacings equal to 49, 48, 47, 46, 45 cm labelled A, B, C, D, E; the experimental results are compared with calculated curves assuming I/r=0.15 whose slopes agree with experiments; the frequency in the resonant zone is almost constant and shows excellent repeatability from one run to the next;

FIG. 22 shows phase measurements vs. velocity separation between the two sensing points is near 2 $\lambda_o$;

FIG. 23 shows that phase curves repeat from one run to the next, that the curve is not changed significantly when the measuring transducer chain consisting of lead-in tube, microphone, cable and preamplifier is exchanged between the two channels; two theoretical curves for a separation equal to 2 $\lambda_o$ with I/r=0 and 1 are drawn for comparison;

FIG. 24 shows the complete system suitable for steam flow measurement using ring sources energized by a subsidiary flow drawn from a suitable tap upstream; stainless steel lead-in tubes with air flow purges to prevent condensation of steam; microphone housings to sustain high pressure, signal feed through pins, needle values to control the purge flow are shown; mean pressures and temperatures are measured by thermocouples and pressure gages with digital outputs and a microcomputer processes frequency, phase, mean pressure and temperature to calculate mass flow, speed of sound and steam quality.

DESCRIPTION OF THE PREFERRED EMBODIMENTS

Introduction

We describe an acoustic flowmeter suitable for average flow measurements in large pipes. Specifically, a non-obstructing, rugged flowmeter suitable for the measurements of steam flows in pipes ranging from a few inches to 30 inches with velocities up to 50 m/s is desired.

A steam flowmeter can be designed to measure flow speeds and the speed of sound waves in a pipe from which temperatures can be obtained. An additional measurement of pressure yields the density and hence the mass flow through the pipe.

The main requirements are that the sound source should be capable of producing sound waves that have well defined frequencies, are plane and propagate in one or two directions, i.e. along and against the flow. The source must be able to withstand high temperatures and pressures that exist in steam pipes such as 600 psi and 850° F., must withstand transient disturbances produced by the operation of control valves etc. The source must be rugged and work for long periods without attention. It rules out loud-speaker-like devices which have fragile diaphragms and other moving parts form consideration.

An Aero Acoustic Source (AAS) seems to be ideally suited to this task because such a source generates sound by using energy from the flow itself. It has the following advantages:

(1) has no moving parts
(2) has no temperature limit
(3) has no pressure limit
(4) is self cleaning
(5) is able to generate intense sound at moderate flow speeds
(6) is physically small
(7) has a well defined frequency
(8) will generate plane waves efficiently because of axisymmetry
(9) will withstand transient surges
(10) will allow compact designs In addition to the AAS, the measuring system requires sound detectors that are rugged enough to withstand the severe conditions. These could be cooled microphones, probe tube microphones or optical devices that see through the flow and detect sound waves based on Schlieren or shadowgraph principles. Probe tube microphones without cooling are satisfactory for the detection of sound in the pipe because high fidelity amplitude response is not required in this application. Although particular embodiments of the invention are described and illustrated below, it is recognized that modifications and variations may readily occur to those skilled in the art and consequently, it is intended that the claims be interpreted to cover such modifications and equivalents.

Theory of the Steam Flowmeter

The measurement technique is different from methods that could be used when the frequencies of the sources can be controlled. In the present case, the aeroacoustic source operates at a fixed wavelength determined by the geometrical parameters (most importantly, the depth) of a ring cavity. The sound waves produced by this source are sensed at two positions also separated by a spacing related to the cavity depth. It could be set to be four times the depth which corresponds to one wavelength, in a typical flowmeter.

When the temperature changes, the speed of sound and frequency also change but not the wavelength. The geometry of the flowmeter is fixed once and for all independent of flow and temperature.

The waves produced by an axisymmetric ring cavity develop rapidly into plane waves unlike sound waves introduced from a side branch in a pipe. These waves move with and against a mean flow. Each part of a sound wavefront tends to be carried by the local flow velocity but diffraction opposes distortions of the wavefront. Therefore we expect the wave to sense the average flow velocity. Even though the sensing taps are located on the pipe walls where the flow velocity is zero, what are measured by phase differences are the average flow velocity and speed of sound.

Elementary Case of Unidirectional Wave Propagation

Figure 1A:
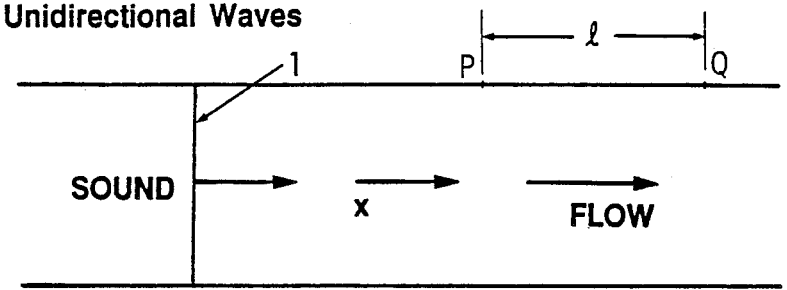
FIG. 1a is a sketch-showing a plane wavefront of sound propagating downstream with the flow, the sound pressure being sensed at points P and Q separated by a distance l.

Sound wave 1 is propagating with the flow in FIG. 1a. Sound pressures are detected by sensors on the wall at P and Q. The time delay between signals P and Q for waves of the form $\cos(-k_+ x + \omega t + \theta)$ is given by.

$$\tau = l / (c+u). \quad (1)$$

Let $k_+$ and $k_-$ denote the wave numbers of sound waves moving downstream and upstream respectively. In the case we are considering, there are no waves associated with $k_-$. The wave numbers are $$k_+ = \omega / (c + u), \quad (2)$$

$$k_- = \omega / (c - u),$$

and their average value is $$(k_+ + k_-)/2 = \omega(1/(c+u) + 1/(c-u))/2 \quad (3)$$
$$= \omega c / (c^2 - u^2)$$
$$= 2\pi / (1 - M^2) \lambda_0.$$

If $l$ is chosen such that $$l(k_+ + k_-)/2 = N\pi, \quad (4)$$

or $$l = N(1 - M^2) \lambda_0 / 2 \text{ where } N = 1,2,3,\ldots,$$

the phase difference between the signals at P and Q becomes $$\begin{aligned} \Delta\beta &= -\omega\tau = -\omega l/(c+u) \\ &= -\frac{2\pi}{\lambda_0}(N(1-M^2)\lambda_0/2)/(1+M) \\ &= -\pi N(1-M). \end{aligned} \quad (5)$$

At $M=0$, the phase shift has the sequence of values, $\pi, 2\pi, 3\pi \ldots$ or equivalently, $\pi, 0, \pi, 0, \ldots$. In particular, when $N=2$, the distance between P and Q is one wavelength, we get $$\Delta\beta = +2\pi M. \quad (6)$$

The same simple result is found to be valid when there are sound waves moving in both directions in the pipe!

Bi-directional Propagation

Figure 1B:
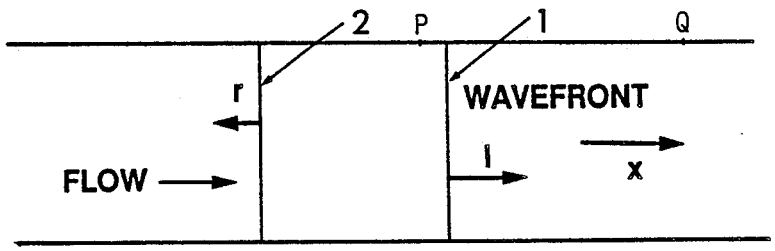
FIG. 1b shows plane wavefronts of amplitude I travelling downstream and of amplitude r travelling upstream.

Let I and r denote the amplitudes of the incident (downstream running) wave 1 and reflected (upstreaming running) wave 2 (FIG. 1b). The sound pressure at x is given by $$p(x,t) = Re\{exp i\omega t (-ik_{30}x) + r \, expi (K_- x + \phi))\} \quad (7)$$

which becomes $$p(x,t) = \quad (8)$$

$$R\cos\left[\omega t - k_+ x + \tan^{-1}\frac{r\sin((k_+ + k_-)x + \phi)}{I + r\cos((k_+ + k_-)x + \phi)}\right]$$

with $R^2 = I^2 + r^2 + 2Ir\cos((k_+ + k_-)x + \phi). \quad (9)$

Another form of expression for the sound pressure can be obtained in terms of differences of wave numbers by introducing $$A = (I + r) / 2 \quad (10)$$

$$B = (I - r) / 2,$$

which gives $$p(x,t) = 2A\cos((k_+ + k_-)/2 + \quad (11)$$

$$\phi/2)\cos((k_+ + k_-)x/2 - \omega t - \phi/2) - 2B\sin(\,)\sin(\,).$$

This reduces to $$p(x,t) = R\cos((k_- - k_+)x/2 + \omega t + \phi/2 - \Psi), \quad (12)$$

where $\Psi = \tan^{-1}((B/A)\tan((k_+ + k_-)x/2 + \phi/2)). \quad (13)$ ps The expression for phase in (12) is more convenient to use than the one in (8). If two locations are separated by a distance l given by (4) as before, the phase difference simplifies to $$\Delta\beta = \beta(x+l) - \beta(x) = (k_- - k_+) l/2 - N\pi \quad (14)$$
$$= [(k_- - k_+)/(k_- + k_+)]N\pi - N\pi$$
$$= -(1-M)N\pi,$$

which is the same as that given by (5) for unidirectional waves. This result is independent of I, r and $\phi$. Therefore, a measurement of $\Delta\beta$ is sufficient to determine the flow Mach number M.

Even though I, r and $\phi$ do not affect this result, the sensitivity of $\Delta\beta$ to errors in l depends on I, r and $\phi$. These effects will be examined in what follows.

Results and Discussion: Theory

Phase distributions

An example will be considered for air flow choosing the values c=350 m/s
f=780 Hz,
u TM 50 m/s,
l=22 cm,
$\phi$=0.

These values satisfy (4) with M=50/350=1/7, in this case. The value of the wavelength at zero flow is $\lambda_o$=35000 / 780=44.87 cm.

In this case l is slightly smaller than $\lambda_o/2$ because of the factor $(1-M^2)=0$, $\beta$ decreases linearly with x with a high negative slope 3 $(-k_+)$ as can be seen from (8). The opposite limit occurs when r=I or B TM 0. In this case $\Psi$32 0, and from (12) it is seen that the phase 4 increases with x with a lower slope $(k_- - k_+)/2$. When r/I has values 0.5 and 0.9, the phase curves exhibit linear growth with superposed, periodic distributions in which 180 degree jumps 5 occur at $\frac{1}{4}$, 3/4, 5/4... wavelengths. The 180 degree jumps 5 come from the tangent inverse function $\Psi$ in (13).

If two positions are chosen on the pipe separated by a distance equal to l (or integral multiples), the phase difference between the signals at these locations is given by $\pi M$ (or integral multiples) which is 26° for u=50 m/s and c=345 m/s. If the distance between the sensing points is smaller than l, the phase differences can be larger. If the two points are on either side of a jump 5, large differences can be observed.

Figure 2:
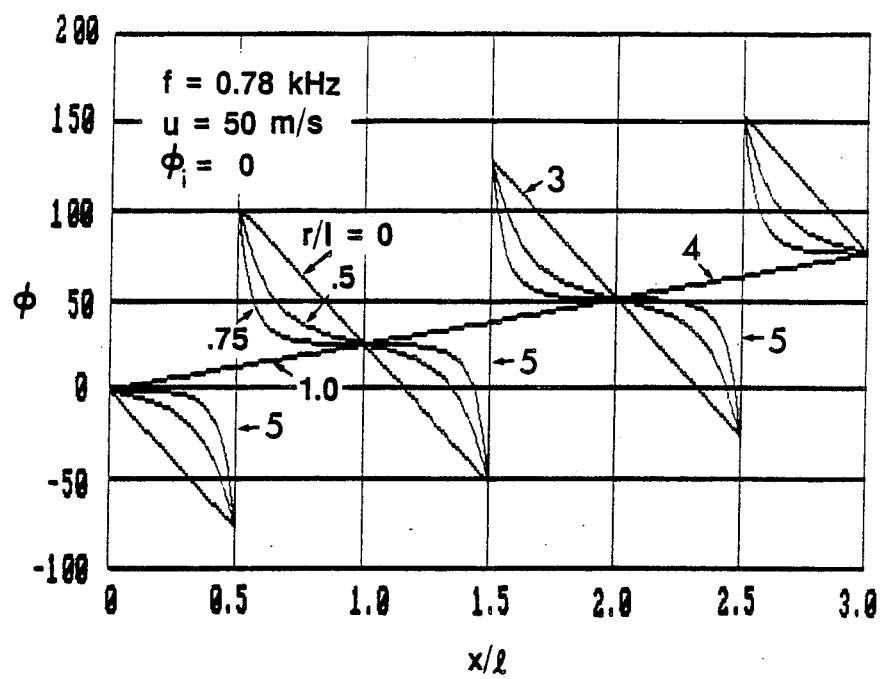
FIG. 2 shows the variation of phase with distance downstream for various ratios of r (upstream running) to I (downstream running); the quantity l=22 cm refers to $(1-M^2)\lambda_o/2$ with $M=1/7$ and $\lambda_o$=wavelength at zero flow; the phase shows linear growth with superposed periodic distributions and phase jumps at $x/l=\frac{1}{2}, 3/2, 5/2, \ldots$.

Even though the phase vs x exhibits a complex structure which depends on r/I, a simple sensor results if the sensing locations are separated by l or its integral multiples. It is clear from FIG. 2 that the sensing locations should not be chosen near x/l=0.5, 1.5,... where rapid phase variations and phase jumps occur.

Phase vs Velocity

Figure 3:
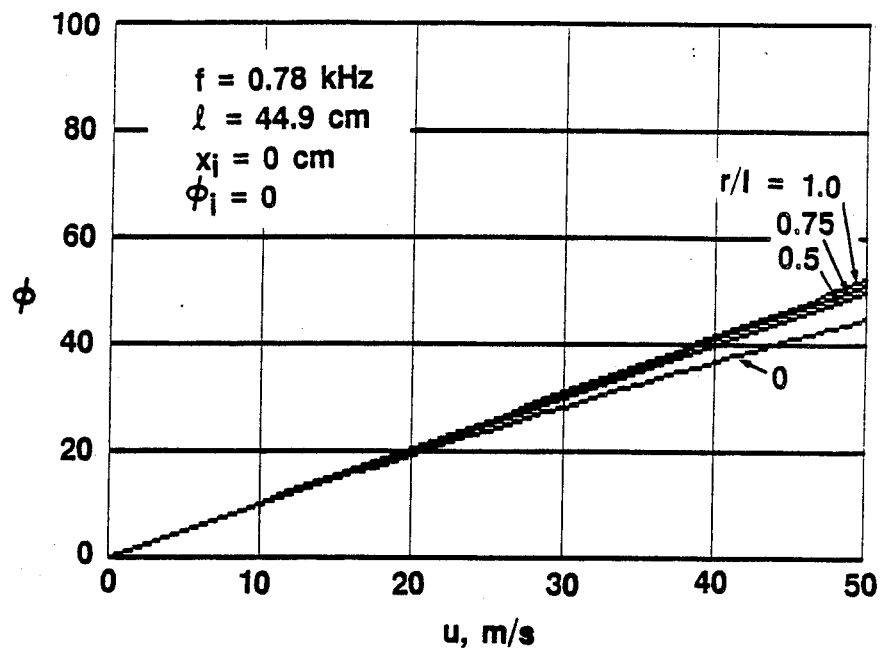
FIG. 3 shows the phase difference between two points separated by a distance equal to $\lambda_o$, the wavelength at zero flow, exhibiting excellent linearity with flow velocity at low velocities and dependence on the ratio r/I at higher velocities.

Let us suppose that the two sensors are chosen at x=0 and x=$\lambda_o$=44.87 cm for the source with f=780 Hz. Because the distance is fixed at $\lambda_o$, and not 2l which depends on the flow Mach number, the phase vs u will depend on r/I. However, as seen in FIG. 3, the effect is not large. In a typical piping system, r/I will be nearly 1 and it is unlikely to be near zero. The curves for r/I=0.5 and 1 differ by only 3° about the mean value equal to 50° at 50 m/s.

For r/I=1, B=0 from (10), $\Psi$=0 from (13) and p=R cos $((k_- - k_+) x/2)$ from (12). For a separation l=$\lambda_o$, the phase difference $$\Delta\beta = (k_- - k_+) \lambda_0/2$$
$$= \left( \frac{\omega}{c-u} - \frac{\omega}{c+u} \right) \lambda_0/2$$
$$= \frac{2u}{c^2 - u^2} \cdot \frac{2\pi f \lambda_0}{2}$$

This slight curvature in $\Delta\beta$ vs u can be seen in FIG. 3. The value of $\Delta\beta$ in (15) is slightly greater than $\pi M$, the linear result for r=0.

Effects of sensing points near a quarter wavelength

Figure 4:
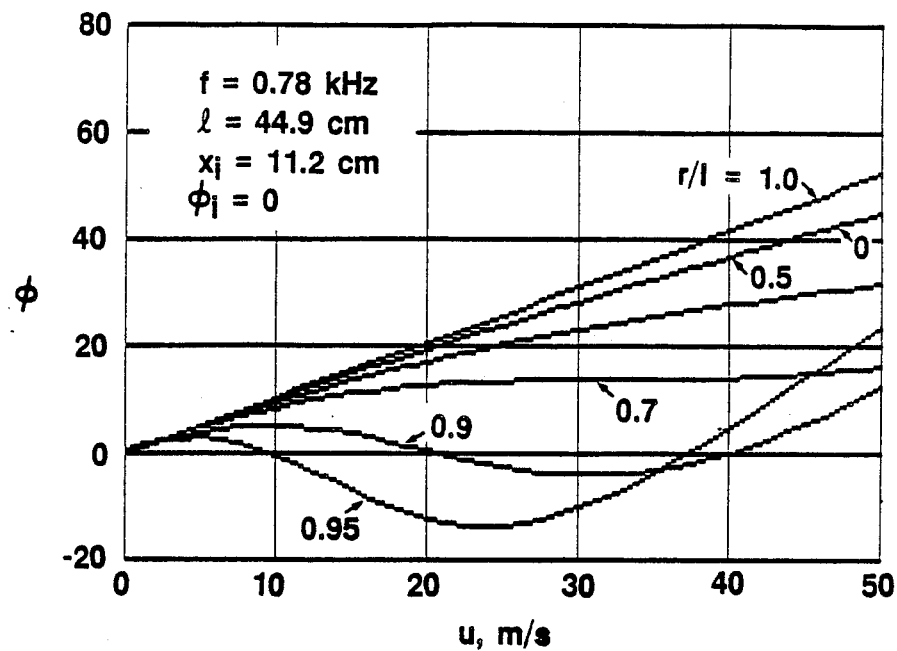
FIG. 4 shows the effects on phase vs. velocity in air flow of sensing points P and Q being deliberately chosen at $\lambda_o/4$ and $3\lambda_o/4$ which are regions near phase jumps; near r/I=1, large distortions occur.

It has been noted before that the phase varies rapidly near the locations of jumps 5 at x/l=0.5, 1.5,.... Pressure taps at these locations will be expected to be sensitive to the ratio r/I. FIG. 4 shows how bad the result is especially for r/I slightly smaller than unity. The phase plots for r/I=0 and 1 remain the same as in FIG. 3 because the phase varies linearly with x in these two cases.

Even in this case, if the distance between the two pressure taps is exactly equal to $(1-M^2) \lambda_o$ instead of $\lambda_o$, the phase difference is simply equal to $\pi M$. It is obvious that locations near $\lambda_o/4$, $3\lambda_o/4$,... should be avoided in the design of a flowmeter because the pressure tap locations will be fixed at a spacing equal to $\lambda_o$, $2\lambda_o$, ... in a practical case.

Effect of choice of initial location

Figure 5:
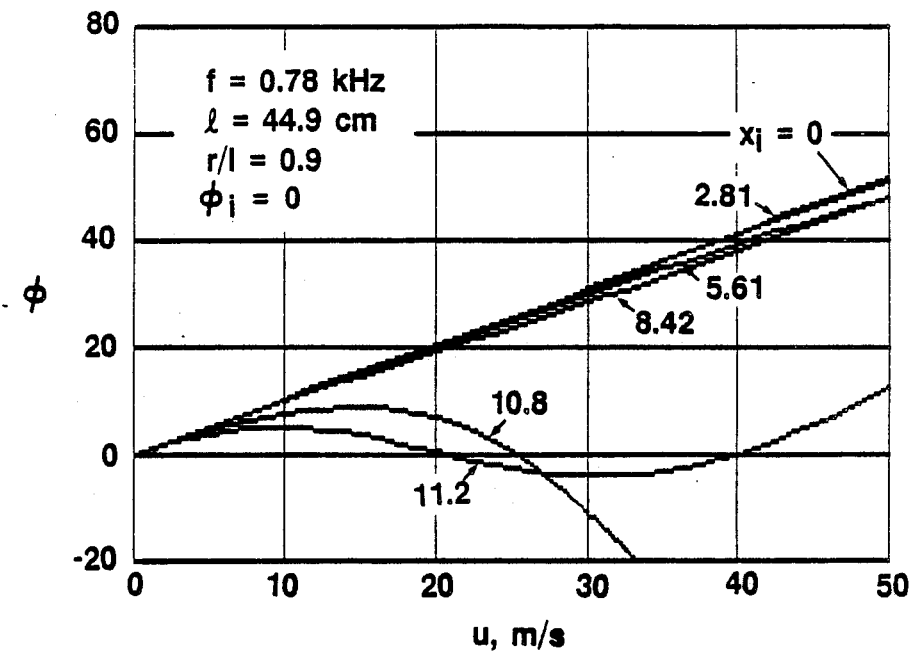
FIG. 5 shows the effect of varying the location of the first sensor from 0 to $\lambda_o/4=11.22$ cm; phase distortions are large when the first tap is near $\lambda_o/4$ but at other locations exhibits good linearity.

We continue the same example and consider the case r/I =0.9 which exhibits large irregular phase changes near $\lambda_o/4$=11.22 cm. Phase curves are shown in FIG. 5 for $x_1$, the location of the first tap, equal to 11.22, 10.82, 8.42, 5.61, 2.81, and 0 cm. Note that from xl=0 to 5.61, the phase plots are virtually identical with (15).

Figure 6:
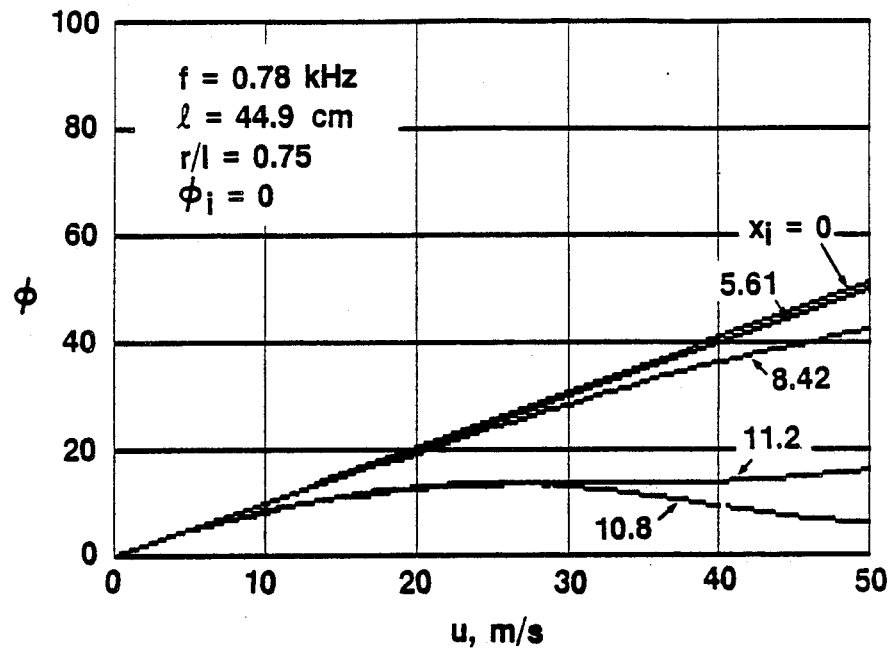
FIG. 6 shows the effects of phase distortions reduced considerably for a case with r/I=0.75.

When the ratio r/I is smaller and is equal to 0.75, the effects of phase distortion are smaller as seen in FIG. 6 for xl=11.22, 10.82, 8.42, 5.61 and 0 cm. Again from $x_1$ =0 to 5.61 cm, the result is essentially that given by (15). In a practical case, $x_1$ can be chosen with less uncertainty than 5 cm; perhaps, an uncertainty of the order of 1 cm is likely to occur.

Effect of incorrect spacing

When the distance between the pressure taps is exactly equal to $\lambda_o$, the wavelength at 780 Hz, which is 44.87 cm, the phase difference is proportional to for l=42.87 and 46.87 cm for the worst case r/I=0.75. Again, we note that l can be adjusted to within 1 mm of the value required in an actual application.

If the frequency varies with flow velocity, changes in frequency produce corresponding changes in $\lambda_o$. For such changes, $$\Delta f/f = \Delta\lambda_o/\lambda_o. \quad (16)$$

For example, a change of 10 Hz will produce a change $$\Delta\lambda_0 = \frac{10}{780} \times 44.87 \text{ cm}$$
$$= 5.75 \text{ mm}.$$

Figure 7:
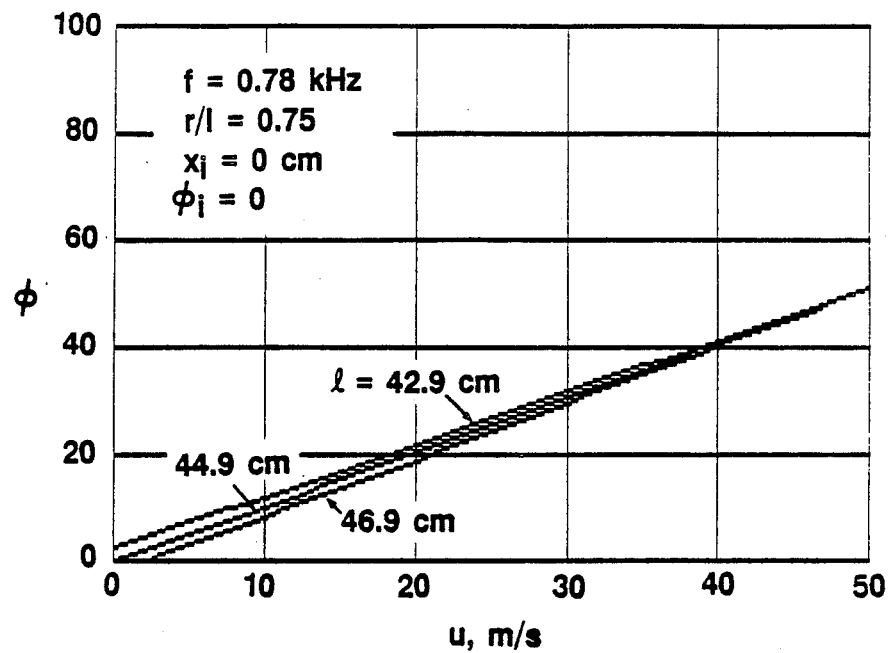
FIG. 7 shows the zero offsets that occur when spacing between the two sensing points is varied near $\lambda_o$=44.87 cm at 780 Hz.

Change of $\Delta\lambda_o$ of this magnitude produce zero offsets of one quarter the amount seen in FIG. 7. In the final sensor these effects may be either taken into account as small corrections or ignored depending on the actual frequency behavior of the source.

Phase vs flow with separations near $\lambda_o$ and $2\lambda_o$.

The phase differences for $l=\lambda_o$ are given by $$\Delta\beta = 2\pi M / (1 - M^2) \text{ for } r/I = 1, \quad (17)$$

and by $$\Delta\beta = 2\pi M / (1 + M) \text{ for } r/I = 0. \quad (18)$$

Figure 8:
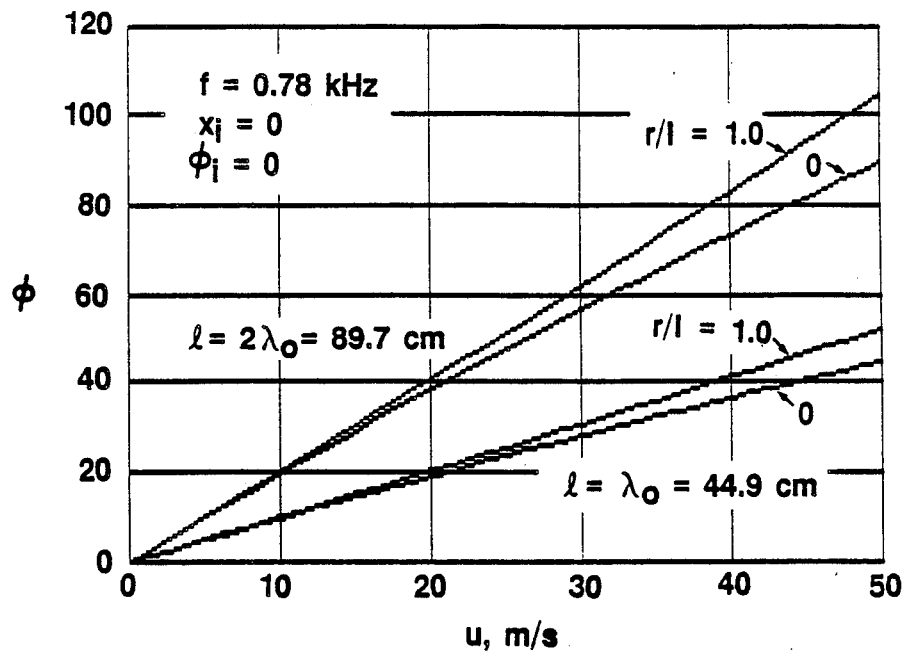
FIG. 8 shows the extreme curves for r/I =0 and 1 for sensing points separated by $\lambda_o$ or $2\lambda_o$; in practical piping systems, the phase curve would lie between the two curves for r/I=0 and 1.

These are shown in FIG. 8. For separations of twice the distance $\lambda_o$, phase curves of twice the values above are obtained. The difference between $r/I=0$ and 1 represent extreme cases even though only values near $r/I=1$ may occur in practice.

Figure 9:
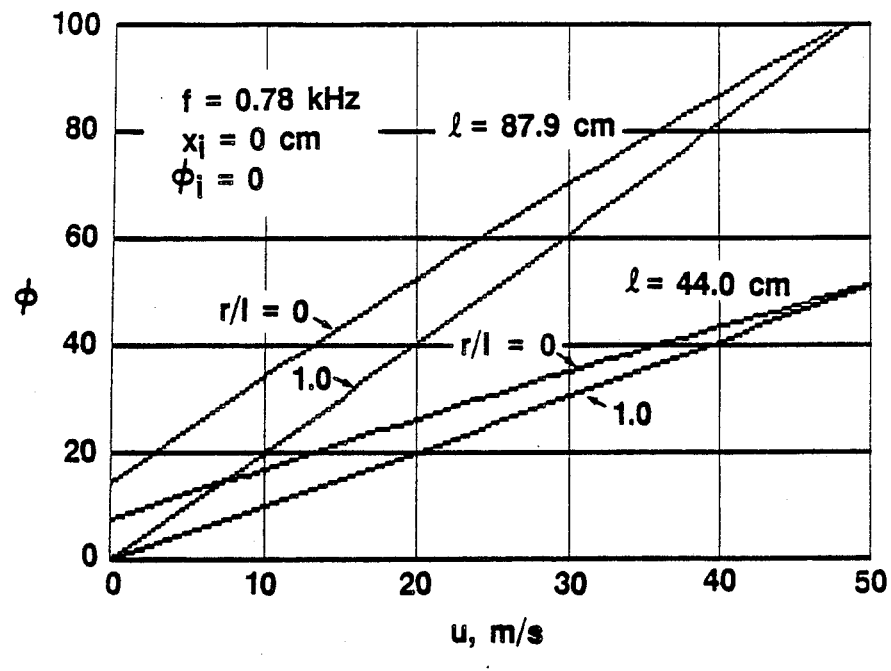
FIG. 9 is a phase vs. velocity curve in air flow where the spacing has been chosen to be equal to the wavelength at 50 m/s; in this case offsets occur near zero flow depending on r/I.

In FIG. 8, l was chosen to be equal to $\lambda_o$ (or $2\lambda_o$), the wavelength at zero flow. This was done to get accurate results near zero flow. However if better results are desired at a maximum flow velocity 50 m/s in air corresponding to a $$\Delta\beta = \pi M_u \quad (19)$$

at the upper limit of Mach number independent of $r/I$. Phase plots for $l=(1(1/7)^2) \lambda_o=43.96$ cm are shown in FIG. 9. This, however, introduces zero offsets when $r/I$ is not equal to unity.

Application for steam flow

Figure 10:
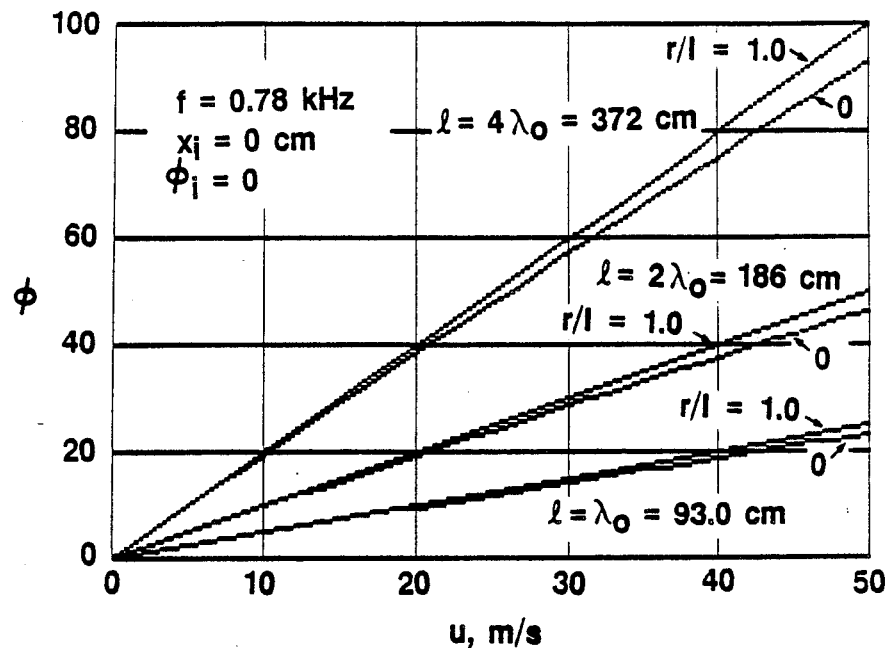
FIG. 10 shows greatly improved results for steam flows where the flow Mach number is very small; the phase curves are essentially straight lines passing through the origin; in the range from 0 to 30 m/s typical of steam flows, a very accurate sensor design would be possible.
Figure 11:
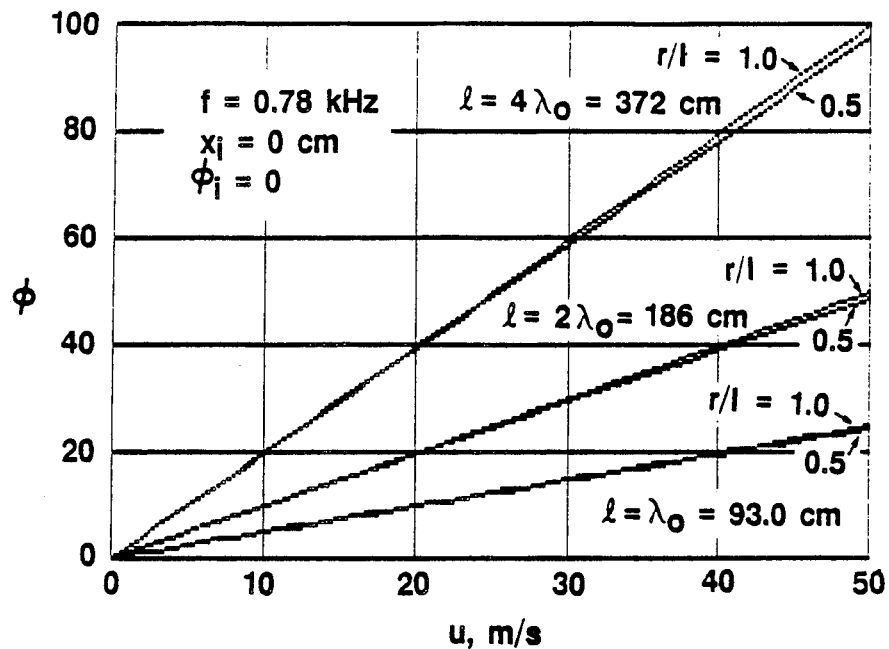
FIG. 11 shows excellent results for steam flows where values of r/I are typical of those in common piping systems (between 1 and 0.5)

The speed of sound is higher in steam. At a temperature equal to 1000° F., $$c=331.3\times(29/18)^{\frac{1}{2}}[((1000-32)5/9+273)/273]^{\frac{1}{2}}=725 \text{ m/s}$$

speeds in large steam pipes generally are below 50 m/s. The Mach numbers of interest are therefore smaller than in cold air flows and are below 0.07. The wavelength at zero flow is 92.95 cm at 780 Hz. Phase curves are shown in FIG. 10 for spacings equal to one, two and four wavelength for $r/I=0$ and 1. We note again that zero is an extreme case and $r/I$ is unlikely to fall below 0.5. The phase curves are much closer in that case. FIG. 11 shows what can be expected in practical piping systems where $r/I$ can be assumed to be in the range 0.5 to 1. From this plot, one can conclude that for the measurement of steam flows, the acoustic method is very promising.

Unidirectional upstream propagation

This case is quite similar to the one shown in FIG. 1 except that sound and flow are moving in opposite directions.

The phase difference is given by the same expressions with the signs of u and M reversed in (1) and (5). In (6), a change of sign does not matter because phase measuring instruments produce an equal response for positive and negative phases. The general expression (12) includes this case because when $I=0$, $B/A=-1$ in (13) which gives $$(x,t)=R \cos (k-x+\omega t+\omega) \quad (20)$$

In FIG. 12, phase curves for $r/I=1$ are compared with those for $r/I=\infty$ for spacings equal to $\lambda_o$ and $2\lambda_o$ for air. The slopes are slightly higher than those for $r/I=1$.

Experiments in air

Experiments were conducted by blowing air through a straight pipe 6 of diameter equal to 5 in. The aeroacoustic source was operated in a passive mode where the flow generates the sound. Sound waves exist both in front and downstream of the ring source 7. Sound pressures were detected by leading the waves from the pressure taps 8 to quartz microphones 9 located 60 cm away. A narrow bore (1 mm diameter) rubber tubing 10 provides sufficient damping of waves in the bore. A sketch of the apparatus is shown in FIG. 13. The blower 11 was able to produce velocities from 150 m/s to zero. Normally, it was operated in a coast-down mode by running it to full speed and shutting off power. The flow coasted down in about 30 seconds to 30 m/s during which time the required data were recorded on xy recorders. The blower could also be operated in a steady state by controlling the inlet flow dampers in which case the flow ranges between zero to 60 m/s and is somewhat more turbulent. When data in the range 0 to 60 m/s was required, the motor was allowed to run to about 80 m/s and was turned off. In this case it coasted down to zero velocity in approximately 2 minutes.

Effect of tubing length

When measuring sound pressures at two locations in the pipe, two identical transducers should be used to make sure that there are no phase shifts between the signals sensed by the two transducers. This means that the lengths of the lead-in tubes must be the same for the two transducers provided that the phase shifts in the amplifiers connected to the two microphones are the same. In the experimental set up used it was necessary to adjust the lengths of one tube to compensate for phase shifts in the amplifiers by as much as 5 mm.

There is one more consideration for the choice of a tubing length. When the tube is rather short, standing waves exist in the bore with the result that resonances occur. In the region of a resonant peak, small changes of frequency produce large phase shifts, which should therefore be avoided. Experimental data were acquired by a large number of coast-down tests starting from a length pronounced when the length exceeds 60 cm. Therefore 60 cm would be a good choice for the lead-in tube length.

In an application for steam flows, the lead in tube 10 would be either narrow bore tubing of copper or stainless steel. The microphone diaphragm senses pressure fluctuations but not the mean pressure because there will be a small leak from one side of the diaphragm to the other. The whole microphone is enclosed in a container at the same pressure as the mean pressure at the pressure tap 8 the lead-in is connected to. Ordinary polymer electret microphones will be adequate. A small airflow can be maintained through the capillary to prevent steam from condensing inside the bore. (FIG. 24)

Sound pressure distributions

When a source is located in a pipe, in addition to the r and I waves generated by the ring source 7, reflected waves arise from discontinuities 12 and 13 at some distance away from the source upstream and downstream. The reflection coefficients $\alpha$ and $\beta$ denote these values. For $x<0$, the waves consist of r, r $\alpha\beta$, r $(\alpha\beta)^2$, ... propagating towards the left together with I$\beta$, I$\beta$ $(\alpha\beta)$, ... also propagating to the left. These add to $(r+I) / (1-\alpha\beta)$. Similarly, $(r\alpha+I\alpha\beta) / (1-\alpha\beta)$ is the amplitude of the resultant wave propagating to the right. The ratio of the two is determined by reflection at the upstream reflector which is $\alpha$, in FIG. 15.

The wave system downstream $(x>o)$ is composed of waves of amplitude $(I+r\alpha)/(1-\alpha\beta)$ propagating to the right and amplitude $(I+r\alpha)\beta/(1-\alpha\beta)$ moving to the left. The standing wave systems are characterized by different ratios of the forward and backward propagating waves which are governed by how the pipe is terminated upstream and downstream.

Experimental data on sound pressure levels downstream of the source is shown in FIG. 16. The coordinate x increases to the left. This data was obtained for a ring source operating at 1380 Hz. Just downstream of the source, the pressure levels decay rapidly in a distance of approximately 20 cm to values close to values characteristic of standing waves. The levels from peak to valleys differ by 10 dB which corresponds to a 50% reflection from the downstream end of the pipe. The amplitude of downstream running waves is twice the amplitude of the reflected wave and the peak sound levels exceed the minimum The sound pressure levels upstream of the source show a slower decay to an approximately constant level in a distance equal to 35 cm which is three times the distance between adjoining peaks in FIG. 16. Peaks and valleys in this distribution differ by two or three decibels. The upstream reflection coefficient is determined by (FIG. 17)

$$20 \log (1-\alpha) = 2 \text{ dB to 3 dB}.$$

This gives $\alpha$ in the range 0.12 to 0.17 for the upstream reflection coefficient.

These values of $\alpha$ and $\beta$ are at a relatively high speed equal to 65 m/s. At lower speeds $\beta$ may be expected to increase and approach unity as the flow velocity tends to zero. The reflection coefficient $\alpha$ may not change much from its low value because it is associated with gradual change in area at the nozzle with no abrupt discontinuity.

Ring source characteristics

A ring source generates sound by utilizing the energy of the flow when conditions are such as to sustain a flow oscillation. An example of a coast-down test is shown in FIG. 18. As the flow coasts down it encounters a zone of resonance 14 with small variations in frequency from 120 m/s to 63 m/s. In this zone, the sound pressure 15 is high. Such resonant zones occur at several intervals of velocity but for the flowmeter application, the primary one occupying a wide range of velocity is the most significant.

A ring source can also be operated using a subsidiary flow to generate sound. Such a source will work over a wide range of velocities including zero velocity. This will be discussed next.

The "active" ring source

A sketch of this type of source is shown in FIG. 19. Bottled nitrogen is used to excite oscillations in the acoustic cavity 16 by blowing a Jet against the sharp edge 17. The width of the nozzle 18 is very small (=1 mm) and the excess pressure needed to produce the jet flow is about 2.5 psi. The quantity of $N_2$ gas needed is approximately 60 g/s. Most of the time, this is much experiments in air where the mean velocity is 60 m/s at its maximum. At extremely low values of the mean flow, the subsidiary flow becomes significant. However, the mean flow, before its approach to the source, is correctly measured by the flowmeter. If the sensing points are located downstream of the source, the velocity measured corresponds to the sum of the original flow and the added subsidiary jet flow.

In an application to a mill where steam flow is to be measured, the subsidiary flow will be obtained from a location upstream of a control valve. The small quantity of steam at a small excess pressure will be readily available.

Phase measurement circuit

The sine wave signal from one of the pressure sensors is amplified and fed to a phase locked loop (PLL) circuit 19 which produces a square wave output locked on to the frequency of the input signal. The output wave is next converted to a form which has equal excursions above and below zero by a.c. coupling. Both channels are treated the same. The square waves are now passed through an analogue switch 20, with one playing the role of a signal and the other the control. The output of the switch is sensitive to the phase difference. This is smoothed by an operational amplifier 21. The final d.c output is an voltage which starts at 2.5 v at 0 phase and varies linearly to 2.5 v at 180°. The circuit diagram is shown in FIG. 20.

Phase measurements

Phases and frequencies are plotted simultaneously during a coast-down test using a two channel $xy_1$, $y_2$ recorder. The x coordinate reads velocity directly because its signal is obtained by taking the square root of the dynamic pressure signal using an analogue multiplier circuit (made by Princeton Applied Research). The frequency of the ring source varies very slightly from 790 Hz at 55 m/s to 775 Hz at zero flow. This variation is taken into account in comparing the data with analytical results.

Five phase plots 22 are shown in FIG. 21. The curves of frequency 23 are identical in the resonant zone from 55 m/s to 10 m/s. It takes a long time to m/s. The experiment is usually stopped near u=10 m/s. The phase curves named A, B, C, D, E are obtained by using the pairs of pressure taps $(-18, -67)$, $(-17, -65)$, $(-18, -65)$, $(-17, -63)$ and $(-18, -63)$ cm. The coordinates upstream of the source have negative values. The distance between the taps for this set has the values 49, 48, 47, 46 and 45 cm. The value of $\lambda_o$ at zero flow is 44.3 cm at 790 Hz and is 45.2 cm at 775 Hz. When the distance between the sensing taps is fixed, this variation in $\lambda_o$ produces zero offsets. The dotted curves are the theoretical curves calculated for the same spacings as the experimental curves. In calculating these, the slight frequency variations seen in the experimental curves has been accounted for. Also, the ratio I/r has been assumed to be 0.15. The initial phase $\phi$ at the source has been taken to be $\pi/2$ which is consistent with an extrapolation of the standing wave distribution to the location of the source in FIG. 16 for a different ring source operating at 1380 Hz. The pairs of curves A and B show good agreement between theory and experiment. C, D, E have the same slope ut deviate at low velocities below 15 m/s.

Another set of data for a spacing near 2 wavelengths is shown in FIG. 22. The spacings for A, B, C, D are 96, 94, 92 and 90 cm respectively. The dotted lines corresponding to these are the theoretical curves calculated as before for I/r=0.15. The theoretical curves have higher slopes than the experimental ones. This suggests that the assumed ratio I/r=0.15 is not as small as this but higher. As I/r increases, the slopes decrease. The wavelength in the case with f=780 Hz is larger and is comparable to the length of the flow nozzle which might therefore lead to stronger reflections than in the case shown in FIG. 16.

The phase curve for a spacing equal to 90 cm is compared with the theoretical curves for both limits I/r=1 and 0 in FIG. 23. The experimental curves show how repeatable the phase plots are from run to run and also shows how close the curves are on interchange of sensors, cables and electronics amplifiers. At high velocities, the slopes are closer to the one for r/I=∞ and at low velocities to r/I=1. If the reflections from the upstream nozzle are larger at lower flows and lower at high flows, the shape of the phase curve can be understood. There is still a phase shift at zero flow which has to be resolved. Perhaps, the first measurement location is too close to the source where for the plane wave theory to apply.

"Active" source configuration for steam flow

FIG. 24 shows a sketch of the system of flow measurement suitable for hot steam flows in a pipe 6, where the ring source 7 is energized by steam at pressure higher than the mean pressure indicated by the pressure gage 24 by a few psi. If required, the solenoid value 25 can be shut off to stop the oscillations of the ring source 7 when measurements are not required. The pressure taps 8 separated by the chosen distance (typically one wavelength) connect to narrow bore stainless steel lead-in tubes 26 which connect to ordinary uncooled microphones 27 contained in housings 28 with provision to allow a small purge of air through ports 29. This airflow will keep steam from entering and condensing in tubing 26. The quantity required is so small that a high resistance is needed in the form of needle values 30 in the lines from the compressed air tank 31. A spring 32 keeps the microphone pressed tight inside the enclosure 28 and the electrical signal leads come out at 33. A small leak is always present between the front and back of the microphone diaphragm in the usual designs because the microphones are made to sense only fluctuating pressures. The leak suppresses response to mean pressure. A thermocouple 34 measures the mean temperature in the steam flow in pipe 6. The lead-in tubes 26 are hot near taps 8 but cool off rapidly such that the microphones 27 and housings 28 are at ambient temperature. The two lines 26 are placed close together such that they have approximately the same temperature distribution and correspondingly the same sound signal time delay from the hot to the cold end of tubing 26. The signal from microphone 27 is amplified by amplifier 35 and converted to a noiseless, symmetric, square wave signal by a phase-lock loop circuit 37 and is applied to one input of a phase detector 38. Similarly, signal from the other microphone passes through amplifier 34 and phase-lock loop 36 to the second input of the phase detector 38. The output of 38 which is a phase difference is read by microcomputer 40. A frequency meter 39 provide a measurement of frequency. Mean pressure and temperature are also read by microcomputer 40 and output device 41 displays phase, flow Mach number, velocity of sound, temperature and in the case of steam flow, steam quality.

Summary and Conclusions

A theoretical analysis of standing wave in a pipe with flow was conducted aimed towards the development of a flowmeter based on a measurement of phase difference between two points on the circumference of a pipe separated axially by an integral multiple of sound wavelength. Effects of non-zero Mach number, variable ratios of upstream and downstream running waves, choice of location of the sensing pressure taps and the initial phase of the standing wave at the source were examined numerically. Calculations were also made for hot steam flow where the maximum Mach number is much smaller than in cold air flows. For an industrial application where steam flow velocities are below 150 ft/s, a very accurate sensor is shown to be possible.

Experimental data were obtained by using an active aeroacoustic source over the range 50 m/s to zero in air. Only the region upstream of the source has been explored. In this region, the wave motion is essentially one of forward propagation. Experimental phase plots obtained by several coast-down tests have been compared with analytical results. The agreement with theory is reasonable.

Although there is some variation between calculated and experimental results, it is clear that for steam flows, much better results can be expected because the maximum Mach number is much smaller. Effects due to the $(1-M^2)$ factor would be imperceptible.

The region downstream of the source contains waves running both up and downstream of approximately the same strengths. Theoretical results exhibit phase vs velocity plots with better characteristics.

REFERENCES

1. Potzick, et al, U.S. Pat. No. 4,445,389, May 1, 1984, "Long Wavelength Acoustic Flowmeter."
2. Fritz, U.S. Pat. No. 4,572,003, Feb. 25, 1986, "Sidetone Generator Flowmeter."
3. Parthasarathy, et al, "Sound Generation by flow over relatively deep cylindrical cavities," J. Acoust. Soc. Am., 78 (5), Nov. 1985, 1785-1795.
4. Shakkottai, et al., "High-intensity tone generation by aeroacoustic sources," J. Acoust. Soc. Am., 82 (6), Dec. 1987, 2075-2085.
5. Migliorini, et al., "Linear differential pressure flow metering with genuine 100:1 turndown capability," paper ISA, 87-1266, pages 1555-1567, Advances in Instrumentation, Vol. 42, part 3, Instrument Society of America.

The embodiments of the invention in which an exclusive property or privilege is claimed are defined as follows:

1. An acoustic phase measurement method for deriving data indicate of average gas flow velocities and temperature in a pipe of arbitrary size; in the case of wet steam flow, additionally also the parameter indicative of steam quality; comprising the steps of:
   (a) installing in said pipe, for the purpose of creating standing waves of sound, an aeroacoustic ring cavity source designed to produce said sound waves of wavelength greater than the pipe diameter,
   (b) choosing a first measurement location at a sound pressure maximum, in the form of a pressure tap, on the wall of said pipe, at said aeroacoustic source, or at a distance equal to an integral multiple of half of said wavelength, to detect said sound waves generated by said aeroacoustic source,
   (c) choosing a second measurement location either upstream or downstream from the first, separated by exactly a whole number N of said half wavelength of sound generated by said aeroacoustic source,
   (d) allowing said sound waves to continue to propagate through identical lead-in tubes of narrow bore to reach sound detecting means mounted at the far ends of said lead-in tubes,
   (e) allowing extremely small purge as flows to exist in said lead-in tubes, in the case of stream flow, to prevent condensation in said narrow bores of said lead-in tubes, (f) detecting sound at said sound detecting means,
(g) amplifying sinusoidal electrical signals produced by said sound detecting means by amplifying means,
(h) conversion of said sinusoidal signals to noiseless square wave signals by phase-lock loop circuit means,
(i) measurement of a phase difference between said square wave signals,
(j) measurement of frequency of either one of said signals,
(k) calculating a Mach number of said gas or steam flow in said pipe by dividing said phase difference by $2\pi N$, N being said integer referred to in (c),
(l) calculating average flow speed through said pipe by multiplying said Mach number by a speed of sound which is known as a function of gas temperature, which is also measured,
(m) or, alternatively, calculating said speed of sound from the characteristics of said aeroacoustic source represented by the equation $c=4(1-M^2)fD$, where the symbols c, M, f, D stand respectively for said speed of sound, said Mach number, said frequency and an effective depth of said aeroacoustic ring cavity source, use of said equation requiring some iterations because of the dependence of c on $M^2$,
(n) and, finally for the case of wet steam flow, also calculating steam quality from steam charts constructed for the variables, speed of sound and temperature, temperature being measured by temperature measurement means and c being calculated as described in (m).

2. A system for processing signals and deriving mass flow and temperature for the case of gas flows and additionally, steam quality for the case of wet steam flow in pipes of arbitrary sizes, the arrangement comprising:

A non-obstructing aeroacoustic ring source containing a sharp edge and a ring cavity producing harmonic sound waves in the pipe flow of wavelength of the order of two pipe diameters; two sensing points in the form of pressure taps of narrow bore located on the pipe wall with a separation in the flow direction equal to an internal multiple of a half wavelength of said harmonic sound wave; two sound detecting means enclosed to enable sound from said pressure taps to be detected uninfluenced by high mean pressures and surges in said flow; lead-in tubes of narrow bore to prevent high temperatures from reaching said sound detectors from said pressure taps, but which convey sound with adequate damping to minimize phase variations with frequency, said lead-in tubes also providing additional surge protection; for steam flows, means for providing a small purge gas flow through said narrow-bore lead-in tubing to prevent condensation of steam; means for controlling a subsidiary flow derived from an upstream location to energize said ring source, if measurements are required to nearly zero flow; electronic amplifying means to amplify the sinusoidal signals produced by said sound detectors; phase-lock loop amplifying means to remove noise and to generate two square wave signals accurately preserving the phase difference between said sinusoidal signals; detector means for measuring said phase difference and frequency of one of said signals; means for measuring mean pressure and temperature of said flow in said pipe; output means for calculating and displaying temperature, mass flow and quality of said flow in said pipe.

3. A system as described in claim 2 wherein the cavity depth of said ring cavity is of the order of the pipe radius, said cavity thereby producing sound waves of wavelength equal to four times said depth or twice the diameter of said pipe.

4. A system as described in claim 2 wherein the diameter of said pipe ranges from an inch to 30 in.

5. A system as described in claim 2 wherein said ring source generates sound at a fixed wave length over a wide range of flow speeds from nearly zero to approximately 50 m/s.

6. A system as described in claim 5 wherein a small subsidiary flow required to drive said ring source is derived from a suitable location upstream of said source where increased pressure on the order of 2 pounds per square inch is available.

7. A system as described in claim 6 wherein said subsidiary flow is regulated.

8. A system as described in claim 2 wherein connections are made from two sound detectors to two chosen locations on the pipe, said sound detectors being enclosed to withstand high means pressures and flow surges in said pipe.

9. A system as described in claim 8 wherein said connections are narrow-bore lead-in tubes which are constructed of a strong metal such as stainless steel which conducts heat poorly thereby allowing the use of an uncooled sound detector at the cold end.

10. A system as described in claim 9 wherein a small purge of compressed gas keeps said tubing bore free of condensation (in the case of steamflow).

11. A system as described in claim 10 wherein said narrow bore of said lead-in tubes is on the order of 1 mm and the length is on the order of 1 m.

* * * * *